(12) United States Patent
Saito

(10) Patent No.: US 10,858,048 B2
(45) Date of Patent: Dec. 8, 2020

(54) STRUCTURAL MEMBER AND METHOD OF PRODUCTION OF SAME

(71) Applicant: NIPPON STEEL & SUMITOMO METAL CORPORATION, Tokyo (JP)

(72) Inventor: Masahiro Saito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 98 days.

(21) Appl. No.: 16/097,792

(22) PCT Filed: May 9, 2017

(86) PCT No.: PCT/JP2017/017598
§ 371 (c)(1),
(2) Date: Oct. 30, 2018

(87) PCT Pub. No.: WO2017/195795
PCT Pub. Date: Nov. 16, 2017

(65) Prior Publication Data
US 2019/0168822 A1    Jun. 6, 2019

(30) Foreign Application Priority Data

May 9, 2016   (JP) .................................. 2016-093992

(51) Int. Cl.
*B62D 25/20*     (2006.01)
*B21D 22/02*     (2006.01)
(Continued)

(52) U.S. Cl.
CPC ......... *B62D 25/2036* (2013.01); *B21D 22/02* (2013.01); *B21D 22/26* (2013.01);
(Continued)

(58) Field of Classification Search
CPC .. B62D 25/2036; B62D 25/04; B21D 35/005; B21D 22/26; B21D 24/00; B21D 22/02; B21D 47/01; B21D 53/88
See application file for complete search history.

(56) References Cited

U.S. PATENT DOCUMENTS

2010/0244497 A1    9/2010   Honda et al.
2012/0297853 A1   11/2012   Tanaka et al.
2013/0239645 A1*   9/2013   Tanaka ................... B21D 22/26
                                                              72/361

FOREIGN PATENT DOCUMENTS

JP    10-278841 A    10/1998
JP    2010-162973 A   7/2010
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2017/017598 , dated Nov. 22, 2018.

(Continued)

*Primary Examiner* — D Glenn Dayoan
*Assistant Examiner* — Melissa Ann Bonifazi
(74) *Attorney, Agent, or Firm* — Birch, Stewart, Kolasch & Birch, LLP

(57) ABSTRACT

A structural member of an integral shaped article using steel sheet having a tensile strength of 590 MPa or more improved in formability, produced using a die or blank holder provided with a space at least at part of a position contacting a blank at the time of pressing it. The structural member comprises a top sheet part including at least one recessed part at an outside edge part in a plan view, a first vertical wall part extending bent from a part or all of an outside edge part including the recessed part in the top sheet part, a first flange (Continued)

part extending bent from an edge of the first vertical wall part at an opposite side to the top sheet part, and a second vertical wall part extending bent from an edge of the top sheet part different from the outside edge part including the recessed part, and at least one projecting part on the top sheet part, the first vertical wall part, or the first flange part.

8 Claims, 8 Drawing Sheets

(51) Int. Cl.
*B21D 47/01* (2006.01)
*B62D 25/04* (2006.01)
*B21D 35/00* (2006.01)
*B21D 22/26* (2006.01)
*B21D 24/00* (2006.01)
*B21D 53/88* (2006.01)

(52) U.S. Cl.
CPC ........... *B21D 24/00* (2013.01); *B21D 35/005* (2013.01); *B21D 47/01* (2013.01); *B21D 53/88* (2013.01); *B62D 25/04* (2013.01)

(56) References Cited

FOREIGN PATENT DOCUMENTS

| JP | 2010-235014 A | 10/2010 |
| JP | 2011-37291 A | 2/2011 |
| JP | 2013-141928 A | 7/2013 |
| WO | WO-2011/145679 A1 | 11/2011 |

OTHER PUBLICATIONS

International Search Report (form PCT/ISA/210) for International Application No. PCT/JP2017/017598 dated Jul. 11, 2017, with English Translation.

* cited by examiner (a)

(b)

STRUCTURAL MEMBER AND METHOD OF PRODUCTION OF SAME

FIELD

The present invention relates to a structural member suitable for a member for automobile use and a method of production of the same.

BACKGROUND

Numerous proposals have been made for strengthening the structure of a lower A-pillar in automobiles in recent years by inside reinforcement so as to protect the passenger compartment.

PTL 1 discloses the art of using a reinforcement at an inside of a lower A-pillar to increase the sheet thickness at the front side of the vehicle and improve the strength with respect to a load input from the front surface.

However, the thick portion formed by the reinforcement is only at the front surface. The load advancing to the side sill is not considered at all. In the art of PTL 1, the front surface of the A-pillar is resistant to the applied load, but if receiving a large load, the load advancing to the side sill will become larger, so the front surface of the A-pillar will not efficiently deform. Only the side sill joined to the side surface of the A-pillar will be greatly deformed. Further, no reduction in weight can be expected.

PTL 2 discloses the art of modifying the structure of the reinforcement inside the A-pillar so that when the front wheel moves at the time of collision, the direction of advance of the front wheel is made to change by the shape of the lower A-pillar and entry of the front wheel into the passenger compartment is suppressed.

The art of PTL 2 is effective only for the case where the front wheel faces the advancing direction and the width of the front wheel is not too large compared with the vehicle width direction of the lower A-pillar. If the front wheel faces a slanted direction or the front wheel is broad in width, no effect can be expected since the load has to be received by a broad surface.

CITATION LIST

Patent Literature

[PTL 1] Japanese Unexamined Patent Publication No. 2011-37291
[PTL 2] Japanese Unexamined Patent Publication No. 2013-141928
[PTL 3] WO2011/145679A

SUMMARY

Technical Problem

At the time of collision of an automobile, a wheel will not always fly into the cabin coaxially with the direction of advance. For this reason, reinforcement at a part away from the lower A-pillar, that is, to the dash side, also becomes necessary. In preparation for such a case, sometimes a dash cross member is connected to the lower inner A-pillar. The dash cross member has a flange which is joined to the lower inner A-pillar. For this reason, there is the problem that when the dash cross member receives displacement, the joined parts easily peel apart.

To solve this problem, it may be considered to use as a lower inner A-pillar a structural member having a three-dimensional three-arm shape having an integrally formed joint in an A-pillar and dash cross direction and further having a joint in the side sill direction and thereby able to transmit a load.

More specifically, as shown in FIG. 1, it is possible to use a structural member comprised of a substantially L-shaped top sheet part (11), a projecting part (12) formed by a stretch flange extending upward from the top sheet part, a vertical wall part (15) bent downward from the top sheet part at an outside edge part (14) including a recessed part (13) and running along the outside edge part, and a substantially L-shaped bottom flange part (16) extending to the outside from the vertical wall part. Such a structural member can be fabricated by stretch flanging and free bending. The stretch flanging is used to form the projecting part (12) while the free bending is used to form the vertical wall part (15) and bottom flange part (16).

Free bending is for example disclosed in PTL 3. The invention described in PTL 3 is a method of forming from a blank a part like an L-shaped member which has a horizontal cross-section of a substantially hat shape and has a bent part with a vertical wall part sticking out to the top sheet part side when viewed on a plane.

More specifically, the blank is placed between a die tool and pad and bending die and (1) in a state where part of the portion of the blank corresponding to the top sheet part is pressed by the pad as a region for suppressing out-of-plane deformation and a state where an end part of a part of the blank corresponding to the bottom side of the L-shape is on the same plane as the top sheet part, the die tool and bending die are made to move relatively in the vertical direction to thereby make the end part of the part of the blank corresponding to the bottom side of the L-shape slide on the portion of the die tool corresponding to the top sheet part (move in plane) while forming the vertical wall part and flange part to thereby form an L-shaped part etc.

Alternatively, (2) in a state where the pad is brought into proximity to or in contact with part of the portion of the blank corresponding to the top sheet part as a region for suppressing out-of-plane deformation and a clearance between the pad and die tool is maintained at the sheet thickness of the blank to 1.1 times the sheet thickness of the blank and a state where an end part of a part of the blank corresponding to the bottom side of the L-shape is on the same plane as the top sheet part, the die tool and bending die are made to move relatively in the vertical direction to thereby make the end part of the part of the blank corresponding to the bottom side of the L-shape slide on the portion of the die tool corresponding to the top sheet part (move in plane) while forming the vertical wall part and flange part to thereby form an L-shaped part etc.

The method of formation using stretch flanging and free bending is an excellent technique for fabricating a structural member having a three-dimensional three-arm shape. However, for example, sometimes the radius of curvature of the boundary of the vertical wall part and bottom flange part is small and sometimes a shape with tougher formability requirement such as with enlargement of the cross-sectional shape of an upper arm or extension of the arm length is demanded. In such a case, further improvement of the formability is required.

In general, when forming a stretch flange such as in FIG. 1, a portion occurs at the end part of the stretch flange where tensile strain concentrates. At that portion, the sheet thickness easily decreases and as a result fracture easily occurs.

This problem easily occurs in particular when forming a structural member using a high strength steel sheet with a tensile strength of 980 MPa or more. Further, when forming a bottom flange such as shown in FIG. 1 by free bending, the sheet thickness is easily decreased at the boundary of the bottom flange and the vertical wall part.

The present invention was made in consideration of this situation and has as its object the provision of a structural member improved in formability and a method of production of the same.

Solution to Problem

The inventors studied in depth the method of improving the formability of a structural member having a three-dimensional three-arm shape. As a result, they obtained the following finding in a method of production of a structural member comprising forming a second vertical wall part (12) in a first step, then forming a first vertical wall part (15) and first flange part (16) in a second step. Specifically, they discovered that when producing the second vertical wall part (12), by not obstructing deformation to outside the plane of the steel sheet at the portion of the blank forming the first flange part (16) in the second step, preferably the portion of the blank forming the vicinity of the boundary of the first flange part (16) and first vertical wall part (15), it is possible to reduce the reduction in sheet thickness of the end part of the second vertical wall part (12) and the reduction in sheet thickness of the first flange part at the second step.

The present invention was made after further study based on the above finding and has as its gist the following:

(1) A structural member of an integral shaped article using a steel sheet having a tensile strength of 590 MPa or more, the structural member comprising: a top sheet part including at least one recessed part at an outside edge part in a plan view; a first vertical wall part extending bent from a part or all of the outside edge part including the recessed part in the top sheet part; a first flange part extending bent from an edge of the first vertical wall part at an opposite side to the top sheet part; a second vertical wall part extending bent from an edge of the top sheet part different from the outside edge part including the recessed part; and at least one projecting part on the top sheet part, the first vertical wall part, or the first flange part.

(2) The structural member of the above (1) wherein the structural member is an integral shaped article using a steel sheet having a tensile strength of 980 MPa or more.

(3) The structural member of the above (1) or (2) wherein a sheet thickness of the structural member is 0.6 to 1.8 mm.

(4) The structural member of any one of the above (1) to (3) wherein a radius of curvature R of the recessed part and a height "h" of the first vertical wall part satisfy $0.6 \leq R/h \leq 3.0$.

(5) The structural member of any one of the above (1) to (4), further comprising a second flange part extending bent from an edge of the second vertical wall part at an opposite side to the top sheet part.

(6) A method of production of the structural member according to any one of claims 1 to 4, the method of production comprising the steps of: placing a flat sheet blank between a die and a blank holder, and forming the second vertical wall part by moving the blank relative to a punch to press and deform the blank; and placing the blank in which the second vertical wall part is formed between a die and a blank holder, and forming a first vertical wall part and a first flange part by moving the blank relative to a punch to press and deform the blank, wherein the die or the blank holder used in the step of forming the second vertical wall part is provided with a space in at least one part of a position contacting the blank at the time of the pressing.

(7) A press working method of the above (6) wherein the space is provided to include a position at which the most amount of material flow when forming the second vertical wall part.

(8) The method of production of the structural member of the above (6) or (7) further comprising a step of placing, between the die and the blank holder, the blank in which the first vertical wall part, the first flange part and the second vertical wall part are formed, and adjusting a shape of the second vertical wall part by moving the blank relative to a punch to press and deform the blank.

(9) A method of production of the structural member of the above (5), the method of production comprising the steps of: placing a flat sheet blank between a die and a blank holder, and forming the second vertical wall part and the second flange part by moving the blank relative to a punch to press and deform the blank; and placing the blank in which the second vertical wall part is formed between a die and a blank holder, and forming the first vertical wall part and the first flange part by moving the blank relative to a punch to press and deform the blank, wherein the die or the blank holder used in the step of forming the second vertical wall part and second flange part is provided with a space in at least one part of a position contacting the blank at the time of the pressing.

(10) A press working method of the above (9) wherein the space is provided to include a position at which the most amount of material flow when forming the second vertical wall part and the second flange part.

(11) The method of production of the structural member according to claim 9 or 10 further comprising the steps of placing the blank in which the first vertical wall part, the first flange part, the second vertical wall part and the second flange part are formed between a die and a blank holder, and adjusting a shape of the second vertical wall part and the second flange part by moving relative to a punch to press and deform the blank.

Advantageous Effects of Invention

According to the present invention, it becomes possible to improve the formability in a method of production of a structural member having a shape with strict formability requirements such as a three-dimensional three-arm shape.

DESCRIPTION OF EMBODIMENTS

Below, a method of production of a structural member of the present invention will be explained.

In the method of production of a structural member of the present invention, a press forming apparatus provided with a punch and die and a pad for pressing a metal sheet or other blank against the punch to constrain it can be used to press-form the blank by stretch flanging and free bending.

Figure 2:
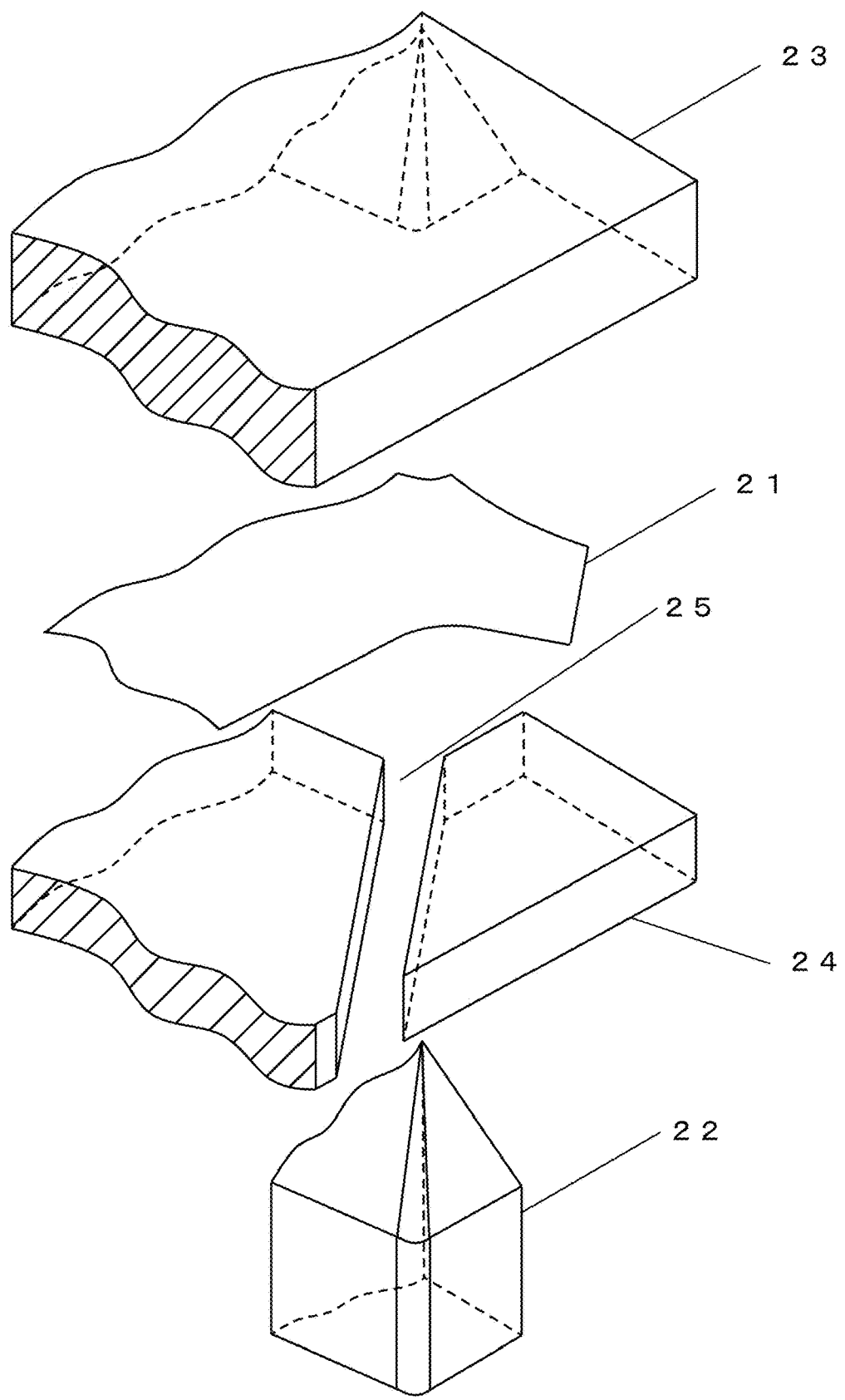
FIG. 2 is a view showing an outline of a first step of a method of production of a structural member of the present invention.

First, as a first step, stretch flanging is used to form a second vertical wall part (12). More specifically, as shown in FIG. 2, a blank (21) is pressed by a punch (22) and die (23) to form a second vertical wall part (12). A blank holder (24) restrains the blank (21) together with the die (23) and adjusts the flow of material or prevents the occurrence of wrinkles. The blank holder (24) does not necessarily have to closely contact the blank (21). There may also be a clearance. In the press forming method of the present invention, the blank holder (24) does not completely cover the blank (21): a space (25) is provided for allowing the inflow of material.

To start, the blank (21) is clamped between the die (23) and the blank holder (24). Next, the punch (22) and die (23) are made to relatively move and the blank (21) is pressed to form the second vertical wall part (12). At this time, the punch (22) is also made a shape not interfering with deformation of the blank (21) at the position corresponding to the space (25) of the blank holder (24).

In the example shown in FIG. 2, the second vertical wall part is formed so as to form a recessed curved line on the blank (21) and so that this curved line becomes the outer peripheral part of the top sheet part. At the center of the top end of the second vertical wall part, tensile strain primarily comprised of strain to the tangential direction of the top end part of the second vertical wall part (part which was outside edge part of blank (21)) concentrates resulting in compressive stress in the minimum main strain direction (generally normal direction at center of top end of second vertical wall part). Here, the "center of the top end part" does not mean the actual center but means the first vertical wall part (15) which is formed later or the top end part of the second vertical wall part close to the R-part of the first flange part. In the face of such compressive stress, at the part of the space (25) of the blank holder (24), the blank (21) is not constrained in the thickness direction and deformation can be induced outside of the plane of the blank (21). Below, such free out-of-plane deformation will be referred to as "free buckling".

In the example of FIG. 2, when pressing the blank (21) to form the top sheet part and second vertical wall part, since the space (25) is provided, material easily flows in in the radial direction of the center of the top end part of the second vertical wall part. As a result, the amount of material flowing in from the top end part of the second vertical wall increases, whereby concentration of strain at the center of the top end part of the second vertical wall part is suppressed and reduction of the sheet thickness of the top end part of the second vertical wall part can be suppressed.

Figure 3:
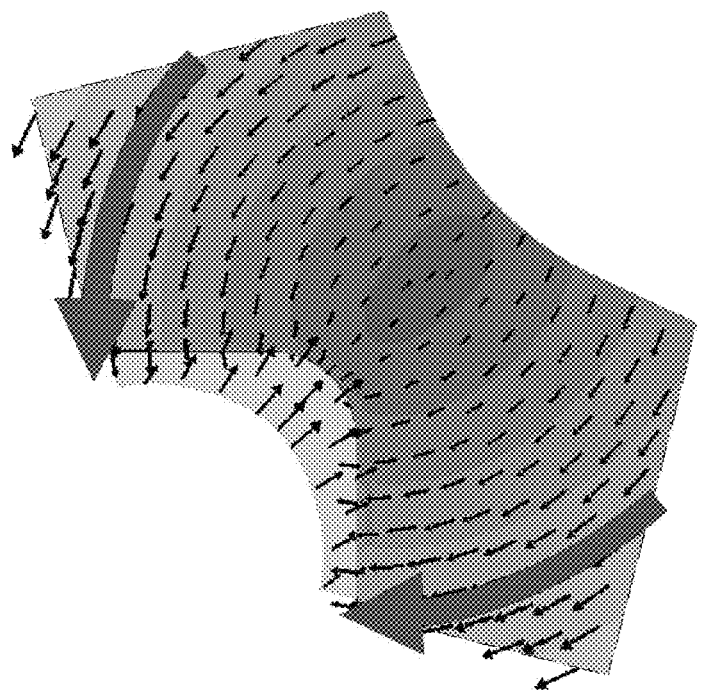
FIG. 3 is a view showing movement of a material when forming a second vertical wall part at a blank.
Figure 3:
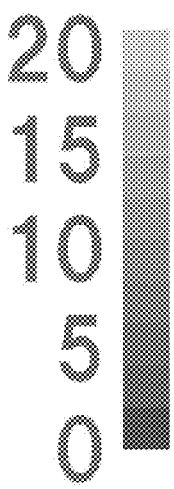
Figure 3:
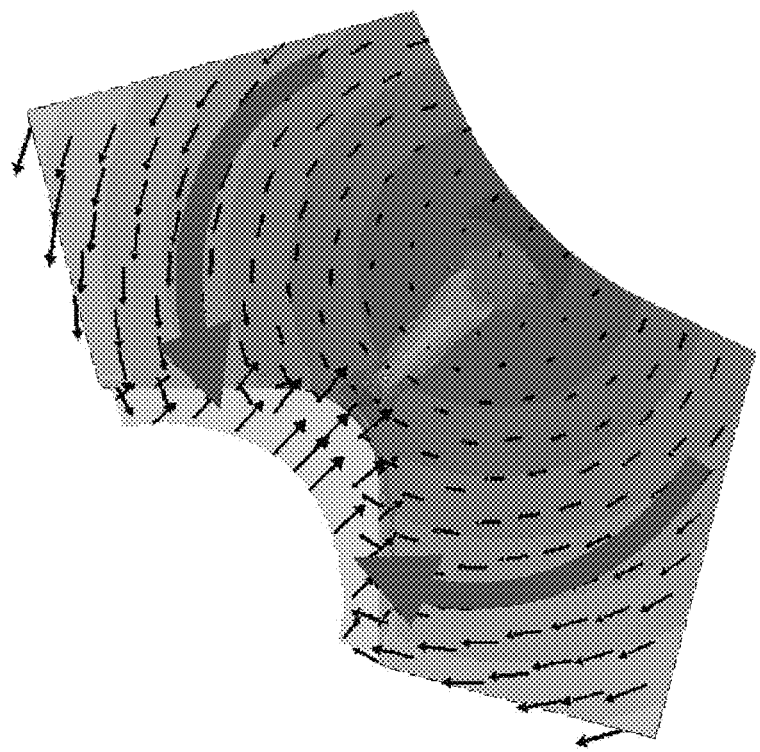
Figure 3:
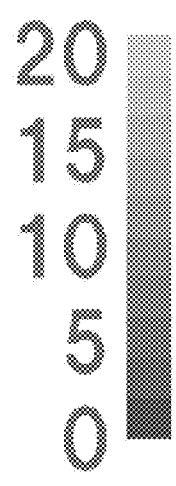

FIG. 3 shows movement of material when forming the second vertical wall part at the blank. (a) is an example in the case where no space is formed at the blank holder, while (b) is an example in the case where a space is formed at the blank holder. As shown by (b) of the present invention, it will be understood that due to the blank holder being provided with the space, the amount of flow of material to the top end part of the second vertical wall part becomes greater.

Due to the free buckling induced by provision of the space (25), compressive deformation is eased, so the line length increases in that direction. As a result, a projecting part deformed to outside of the plane in the direction of the space (25) is formed at part of the shape after formation. In the method of production of the present invention, the position where the projecting part occurs is preferably the portion where the first flange part (16) is formed in the later explained second step, more preferably the portion where the boundary of the first flange part (16) and the first vertical wall part (15) is formed. The reason is that when forming the first flange part by free bending, the sheet thickness near the boundary of the first flange part and the first vertical wall part easily decreases the most.

The shape or size of the space (25) is not particularly limited. If provided at the part where inflow of the material and increase in thickness are intended, the effect of the present invention can be obtained. If considering the function of effectively inducing deformation to outside of the plane, which is the point of the present invention, and holding down the blank (21) of the blank holder (24), this should be made a slit of a width of 60 to 200 mm or so.

Figure 4:
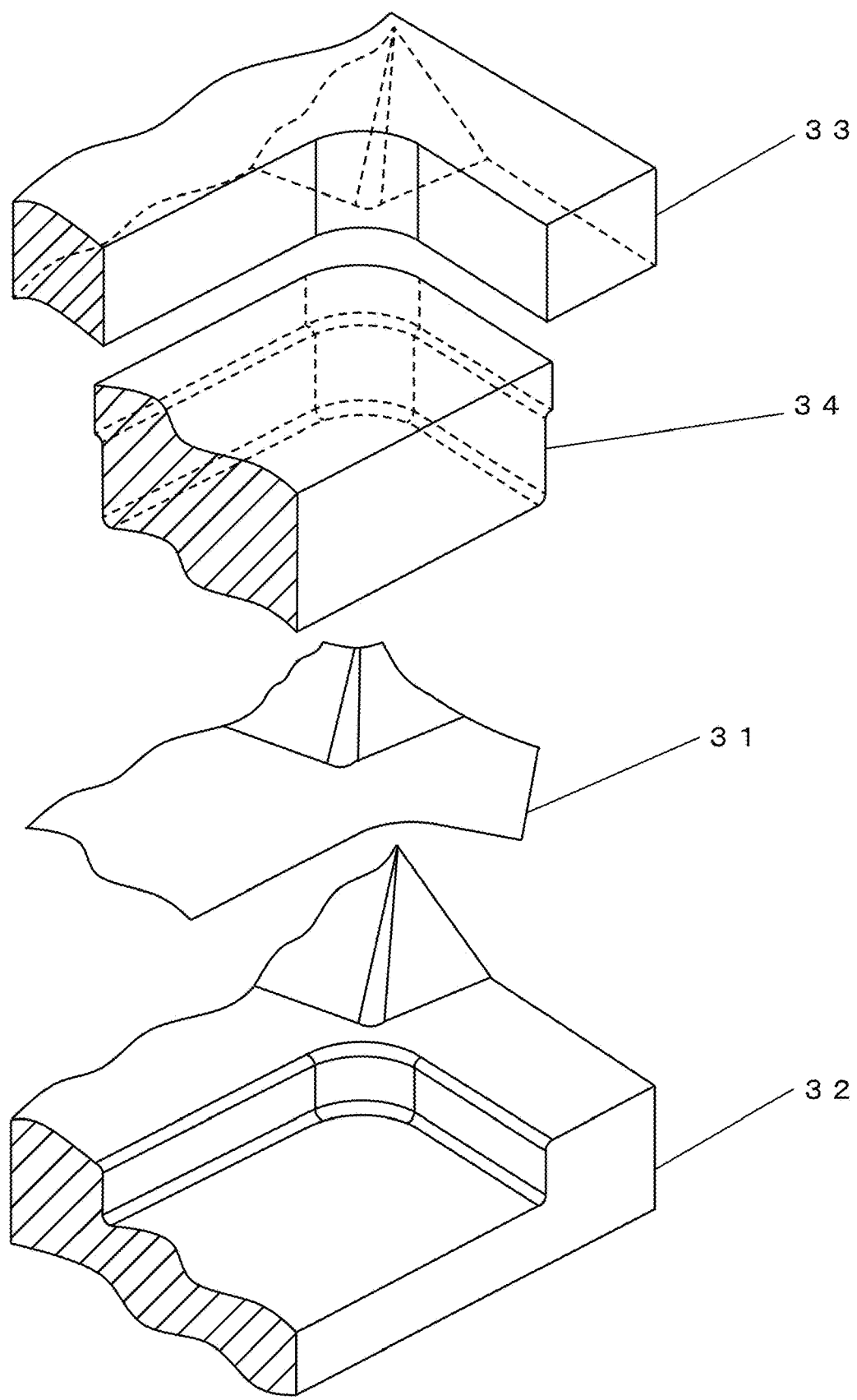
FIG. 4 is a view showing an outline of a second step of a method of production of a structural member of the present invention.

At the next second step, the first vertical wall part (15) and first flange part (16) are formed. More specifically, as shown in FIG. 4, the blank (31) is formed with a flange using the punch (32) and die (34). The pad (33) presses the blank (31) against the punch (32) to hold it. By pressing the blank (31) fastened by the die (34), the blank is simultaneously formed with the first vertical wall part (15) and first flange part (16) along the outside edge part.

At that time, as explained above, at the first step, a projecting part is formed at the portion becoming the first flange part (16) at the second step, preferably at the portion becoming the boundary of the first flange part (16) and the first vertical wall part (15), so the reduction in the sheet thickness at the portion where reduction of sheet thickness easily occurs due to free bending is reduced.

Figure 5:
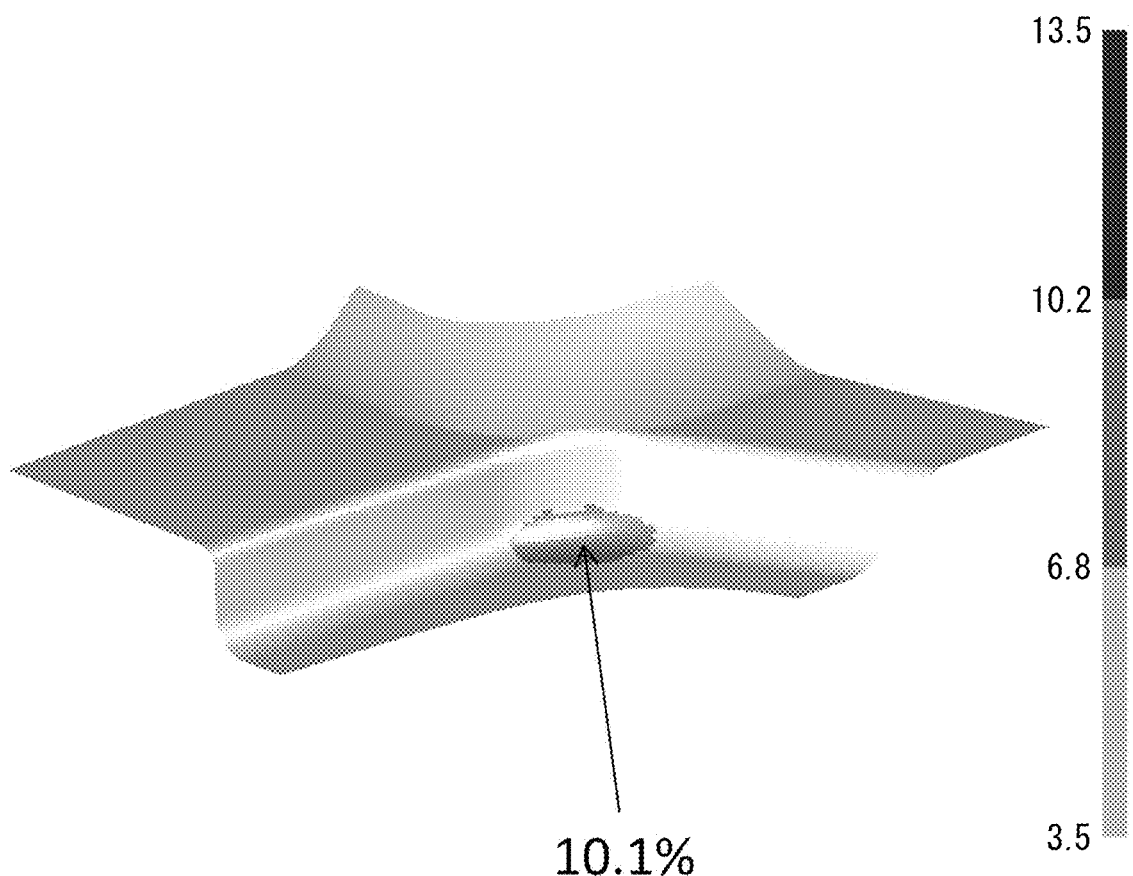
FIG. 5 is a view showing an example of a rate of reduction of sheet thickness of a structural member fabricated by a method of production of the present invention.
Figure 6:
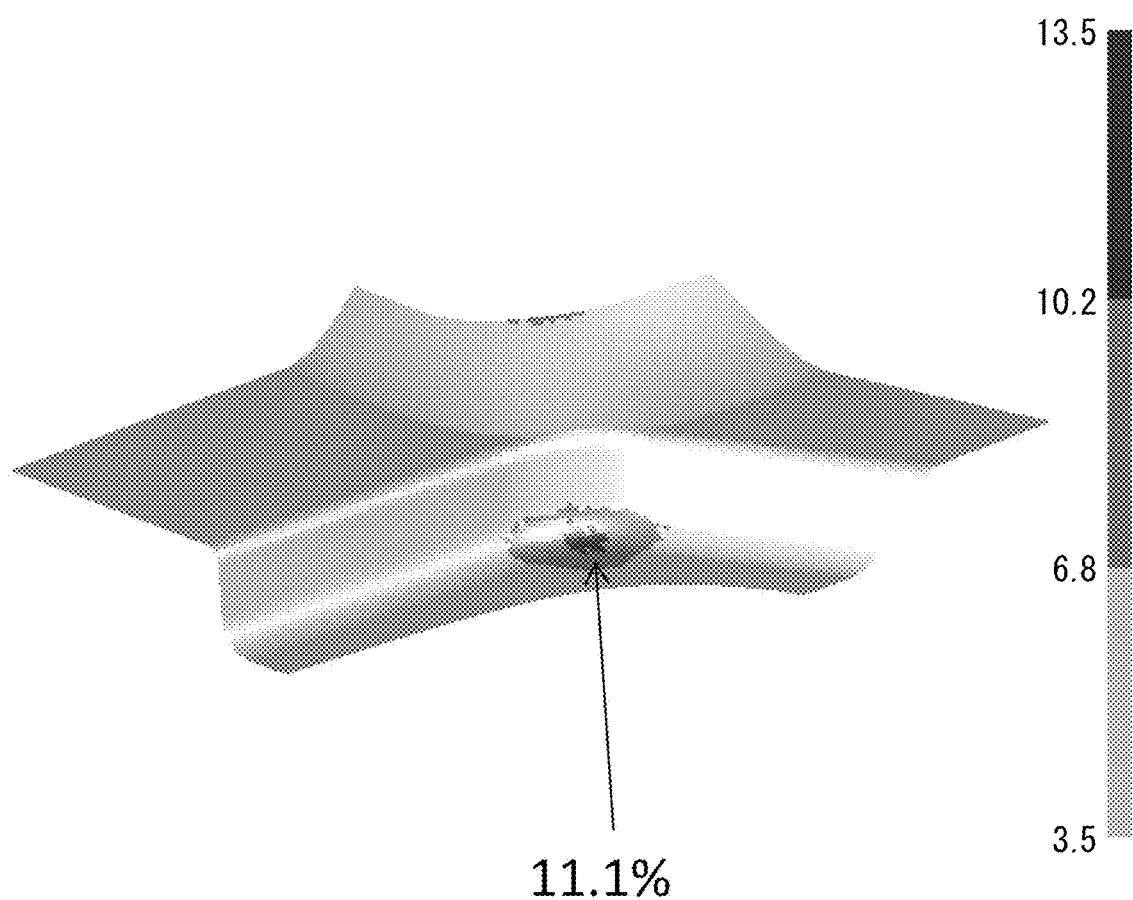
FIG. 6 is a view showing an example of a rate of reduction of sheet thickness of a structural member fabricated by a method of production not using free buckling.

FIG. 5 is a view showing an example of the rate of reduction of sheet thickness of a structural member fabricated by the method of production of the present invention. FIG. 6 shows the rate of reduction of sheet thickness of a structural member fabricated by a method of production where free buckling does not occur.

From the results of FIGS. 5 and 6, it will be understood that according to the method of production of the present invention, the rate of reduction of the sheet thickness can be reduced.

Figure 7:
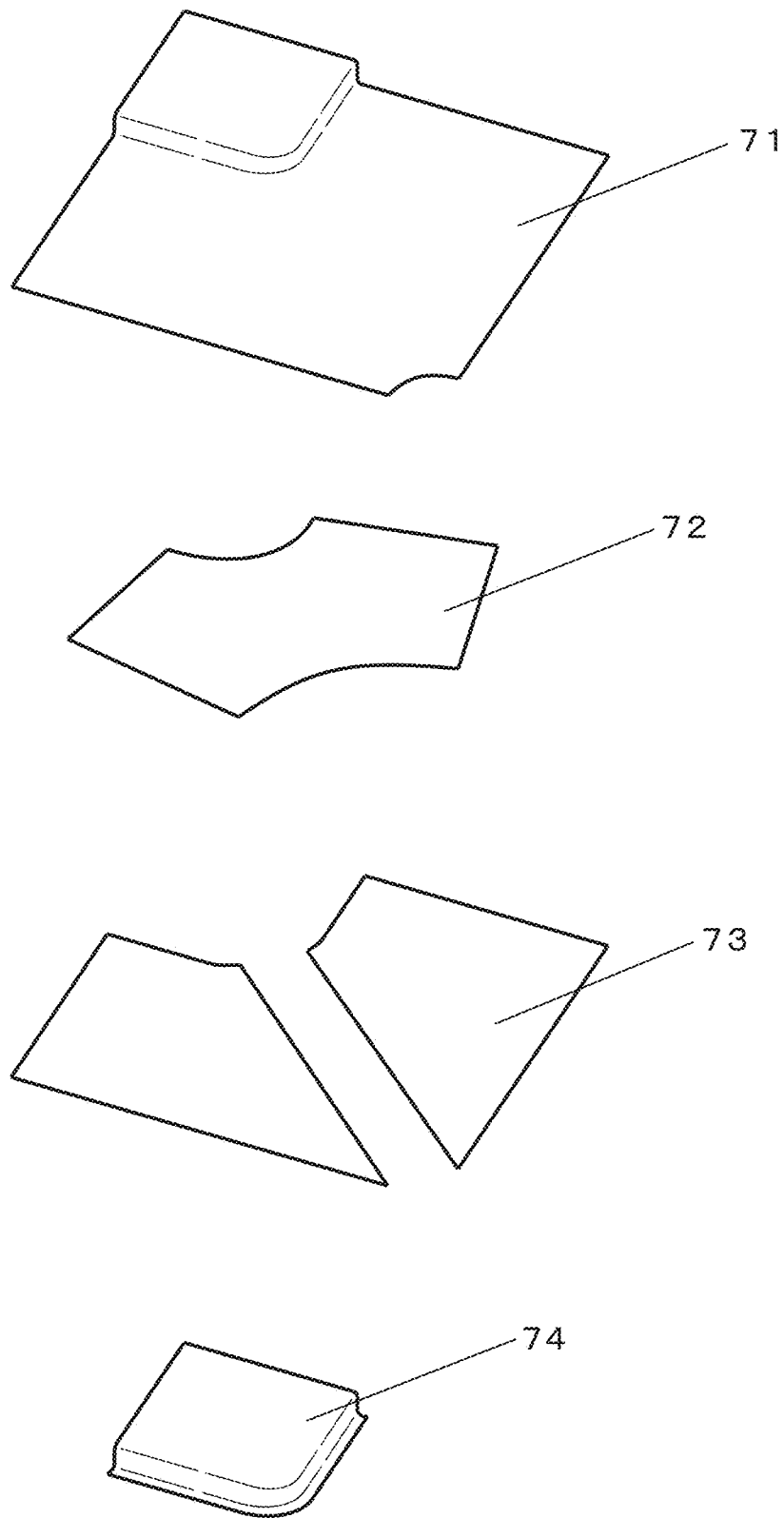
FIG. 7 is a view showing another outline of a first step of a method of production of a structural member of the present invention.

At the first step, a second flange part extending bent from the second vertical wall part may be formed. An outline of the case of forming the second vertical wall part and second flange part at the first step is shown in FIG. 7. If compared with the example shown in FIG. 2, the shapes of the die (71) and punch (74) differ. By pressing the blank (72), a second flange part extending bent from the second vertical wall part is formed together with the second vertical wall part.

After the second step, a restrike step placing the blank at which the first vertical wall part (15) and first flange part (16) and the second vertical wall part (12) are formed between the die and the blank holder and making it move relative to the punch to thereby adjust a shape of the second vertical wall part (12).

According to the method of production of a structural member of the present invention explained above, a structural member having a shape with a tough formability requirement such as a three-dimensional three-arm shape can be produced in a short work time without using a specialty apparatus by performing processing using a general press machine. In particular, this is effective for the production of a structural member using high strength steel sheet which easily fractures at the time of working it.

Note that in this example, the flange was made a three-arm type, but it is also possible to similarly form a four-arm flange. A four-arm flange can, for example, be made a shape having a top sheet part formed into a substantial T-shape, provided with vertical wall parts and flanges along the two outside edge parts forming substantial L-shapes, and having projecting parts of flanges extending near the intersections of the T-shape of the top sheet part.

Figure 8:
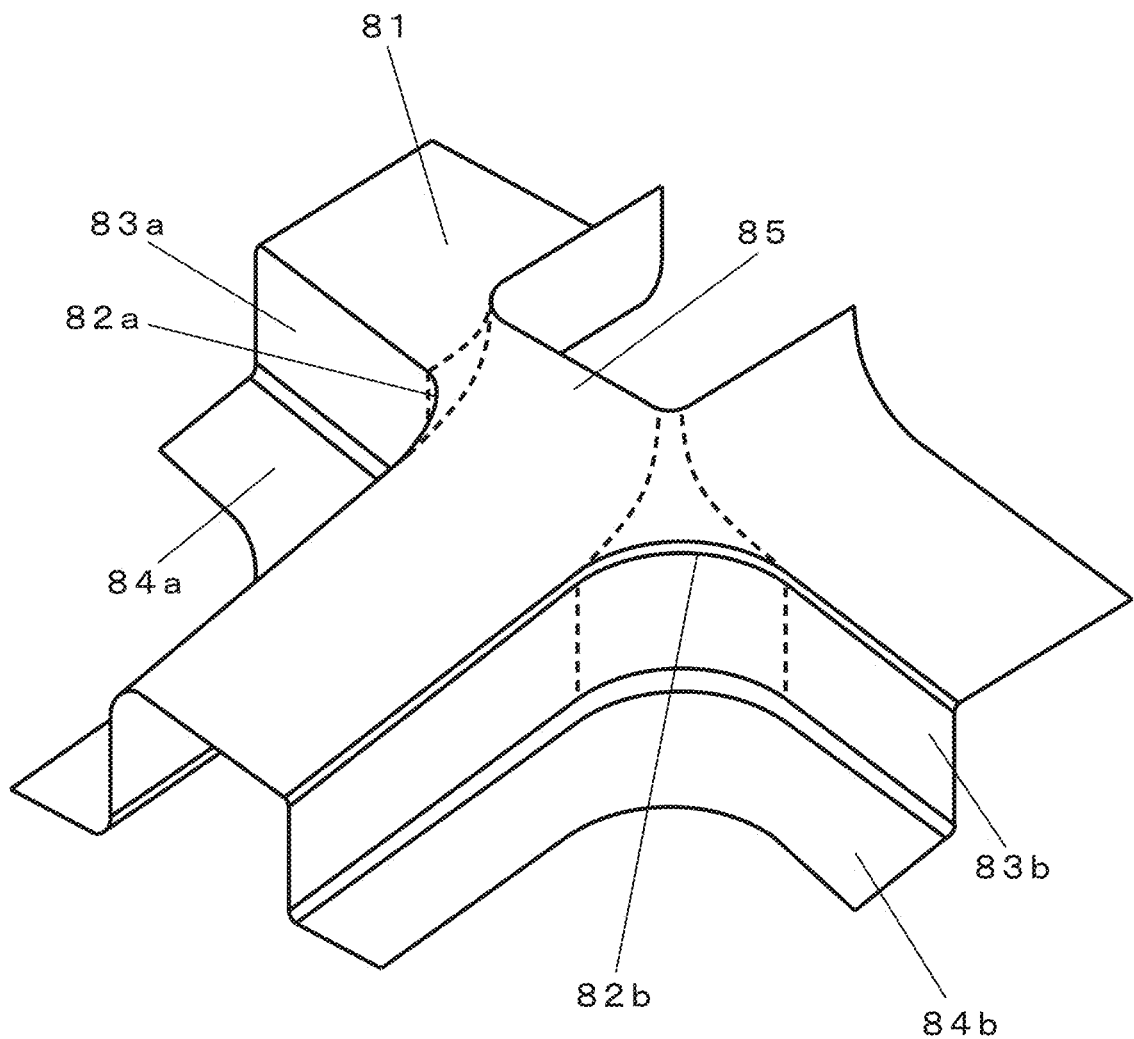
FIG. 8 is a view showing one example of a structural member having a four-arm flange.

FIG. 8 shows one example of a four-arm flange. The example of FIG. 8 is provided with a top sheet part 81 including two recessed parts 82a, 82b at the outside edge part in the plan view, first vertical wall parts 83a, 83b extending bent respectively from the recessed parts 82a, 82b, first flange parts 84a, 84b extending bent respectively from the edges of the first vertical wall parts 83a, 83b at the opposite sides from the top sheet part, and a second vertical wall part 85 extending bent from an edge of the top sheet part different from the outside edge parts including the recessed parts.

In this way, by changing the shapes of the punch and die, it is clear that various shapes of structural members can be produced without being limited to the example of the above-mentioned joint. These modifications are needless to say also included in the present invention.

Further, as the blank, high strength steel sheet with a sheet thickness of 0.6 to 1.8 mm, preferably 0.6 to 1.2 mm, and a tensile strength of 980 MPa or more is suitable, but depending on the application, other steel sheets, aluminum alloy sheets, FRP and other plastic composite material sheets etc. can also be used.

Further, in the structural member, the curvature R in the case of viewing the top sheet part from the top surface and the height "h" of the first vertical wall part are not particularly limited. However, if using the method disclosed in the present invention, even with a shape of an R/h of 0.6 to 3.0, a structural member with decreased shaping defects can be formed. R/h is more preferably 0.8 to 2.7.

EXAMPLES

Figure 1:
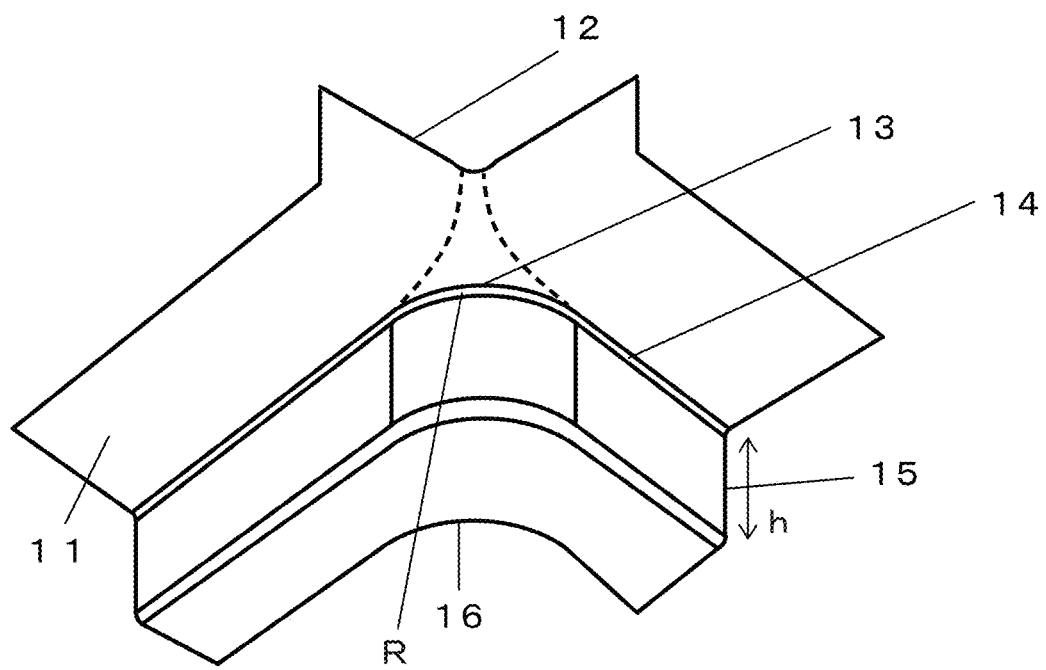
FIG. 1 is a view showing one example of a structural member having a three-dimensional three-arm shape.

Using various materials, a structural member having the three-arm structure shown in FIG. 1 was prepared. The blank was comprised of the material shown in the "Materials" column. In each invention example shown in Table 1, the blank having the sheet thickness shown in the "Sheet thickness" column was clamped between the die (23) and the blank holder (24) shown in FIG. 2 and the punch (22) and die (23) were made to move relative to each other to form the second vertical wall part. In each comparative example, a second vertical wall part was similarly formed using a blank holder (24) with no space (25).

Next, the pad (33) shown in FIG. 4 is used to press the blank against the punch (32) to hold it there and the blank fastened by the die (34) is pressed so as to simultaneously form the first vertical wall part and first flange along the outside edge part.

The results of the formation process are shown in Table 1. In the results of the formation process in the table, "A" indicates that the member could be formed, "B" indicates that necking occurred at the second vertical wall part, and "C" indicates that cracks formed at the second vertical wall part. Further, in the table, "R" indicates the curvature when viewing the top sheet part from the top surface while "h" indicates the height of the first vertical wall part (see FIG. 1).

According to the present invention, it could be confirmed that a structural member having a three-arm structure could be formed without regard as to the type, thickness, and shape of the material.

TABLE 1

| | Material | Sheet thickness/mm | h/mm | R/mm | R/h | Maximum rate of reduction of sheet thickness of second vertical wall part/% | Results of shaping |
|---|---|---|---|---|---|---|---|
| Inv. Ex. 1 | 1180 MPa class high strength steel sheet | 0.6 | 100 | 80 | 0.8 | 7 | A |
| Comp. Ex. 1 | 1180 MPa class high strength steel sheet | 0.6 | 100 | 80 | 0.8 | Fractures | C |
| Inv. Ex. 2 | 1180 MPa class high strength steel sheet | 0.6 | 50 | 80 | 1.6 | 5 | A |
| Comp. Ex. 2 | 1180 MPa class high strength steel sheet | 0.6 | 50 | 80 | 1.6 | Fractures | C |
| Inv. Ex. 3 | 1180 MPa class high strength steel sheet | 0.6 | 30 | 80 | 2.7 | 5 | A |
| Comp. Ex. 3 | 1180 MPa class high strength steel sheet | 0.6 | 30 | 80 | 2.7 | Fractures | C |
| Inv. Ex. 4 | 980 MPa class high strength steel sheet | 0.6 | 100 | 80 | 0.8 | 8 | A |
| Comp. Ex. 4 | 980 MPa class high strength steel sheet | 0.6 | 100 | 80 | 0.8 | Fractures | C |
| Inv. Ex. 5 | 980 MPa class high strength steel sheet | 0.6 | 50 | 80 | 1.6 | 7 | A |
| Comp. Ex. 5 | 980 MPa class high strength steel sheet | 0.6 | 50 | 80 | 1.6 | Fractures | C |
| Inv. Ex. 6 | 980 MPa class high strength steel sheet | 0.6 | 30 | 80 | 2.7 | 6 | A |
| Comp. Ex. 6 | 980 MPa class high strength steel sheet | 0.6 | 30 | 80 | 2.7 | Fractures | C |
| Inv. Ex. 7 | 780 MPa class high strength steel sheet | 0.6 | 100 | 80 | 0.8 | 8 | A |
| Comp. Ex. 7 | 780 MPa class high strength steel sheet | 0.6 | 100 | 80 | 0.8 | Fractures | C |
| Inv. Ex. 8 | 780 MPa class high strength steel sheet | 0.6 | 50 | 80 | 1.6 | 7 | A |
| Comp. Ex. 8 | 780 MPa class high strength steel sheet | 0.6 | 50 | 80 | 1.6 | 16 | B |
| Inv. Ex. 9 | 780 MPa class high strength steel sheet | 0.6 | 30 | 80 | 2.7 | 7 | A |
| Comp. Ex. 9 | 780 MPa class high strength steel sheet | 0.6 | 30 | 80 | 2.7 | 16 | B |
| Inv. Ex. 10 | 590 MPa class high strength steel sheet | 0.6 | 100 | 80 | 0.8 | 10 | A |
| Comp. Ex. 10 | 590 MPa class high strength steel sheet | 0.6 | 100 | 80 | 0.8 | 20 | B |
| Inv. Ex. 11 | 590 MPa class high strength steel sheet | 0.6 | 50 | 80 | 1.6 | 9 | A |
| Comp. Ex. 11 | 590 MPa class high strength steel sheet | 0.6 | 50 | 80 | 1.6 | 19 | B |
| Inv. Ex. 12 | 590 MPa class high strength steel sheet | 0.6 | 30 | 80 | 2.7 | 8 | A |
| Comp. Ex. 12 | 590 MPa class high strength steel sheet | 0.6 | 30 | 80 | 2.7 | 15 | A |
| Inv. Ex. 13 | 1180 MPa class high strength steel sheet | 1.2 | 100 | 80 | 0.8 | 9 | B |

TABLE 1-continued

|  | Material | Sheet thickness/mm | h/mm | R/mm | R/h | Maximum rate of reduction of sheet thickness of second vertical wall part/% | Results of shaping |
|---|---|---|---|---|---|---|---|
| Comp. Ex. 13 | 1180 MPa class high strength steel sheet | 1.2 | 100 | 80 | 0.8 | Fractures | C |
| Inv. Ex. 14 | 1180 MPa class high strength steel sheet | 1.2 | 50 | 80 | 1.6 | 7 | A |
| Comp. Ex. 14 | 1180 MPa class high strength steel sheet | 1.2 | 50 | 80 | 1.6 | Fractures | C |
| Inv. Ex. 15 | 1180 MPa class high strength steel sheet | 1.2 | 30 | 80 | 2.7 | 6 | A |
| Comp. Ex. 15 | 1180 MPa class high strength steel sheet | 1.2 | 30 | 80 | 2.7 | Fractures | C |
| Inv. Ex. 16 | 980 MPa class high strength steel sheet | 1.2 | 100 | 80 | 0.8 | 14 | B |
| Comp. Ex. 16 | 980 MPa class high strength steel sheet | 1.2 | 100 | 80 | 0.8 | Fractures | C |
| Inv. Ex. 17 | 980 MPa class high strength steel sheet | 1.2 | 50 | 80 | 1.6 | 8 | A |
| Comp. Ex. 17 | 980 MPa class high strength steel sheet | 1.2 | 50 | 80 | 1.6 | Fractures | C |
| Inv. Ex. 18 | 980 MPa class high strength steel sheet | 1.2 | 30 | 80 | 2.7 | 7 | A |
| Comp. Ex. 18 | 980 MPa class high strength steel sheet | 1.2 | 30 | 80 | 2.7 | Fractures | C |
| Inv. Ex. 19 | 780 MPa class high strength steel sheet | 1.2 | 100 | 80 | 0.8 | 14 | A |
| Comp. Ex. 19 | 780 MPa class high strength steel sheet | 1.2 | 100 | 80 | 0.8 | Fractures | C |
| Inv. Ex. 20 | 780 MPa class high strength steel sheet | 1.2 | 50 | 80 | 1.6 | 11 | A |
| Comp. Ex. 20 | 780 MPa class high strength steel sheet | 1.2 | 50 | 80 | 1.6 | 18 | B |
| Inv. Ex. 21 | 780 MPa class high strength steel sheet | 1.2 | 30 | 80 | 2.7 | 10 | A |
| Comp. Ex. 21 | 780 MPa class high strength steel sheet | 1.2 | 30 | 80 | 2.7 | 16 | B |
| Inv. Ex. 22 | 590 MPa class high strength steel sheet | 1.2 | 100 | 80 | 0.8 | 12 | A |
| Comp. Ex. 22 | 590 MPa class high strength steel sheet | 1.2 | 100 | 80 | 0.8 | 20 | B |
| Inv. Ex. 23 | 590 MPa class high strength steel sheet | 1.2 | 50 | 80 | 1.6 | 10 | A |
| Comp. Ex. 23 | 590 MPa class high strength steel sheet | 1.2 | 50 | 80 | 1.6 | 19 | B |
| Inv. Ex. 24 | 590 MPa class high strength steel sheet | 1.2 | 30 | 80 | 2.7 | 10 | A |
| Comp. Ex. 24 | 590 MPa class high strength steel sheet | 1.2 | 30 | 80 | 2.7 | 14 | A |
| Inv. Ex. 25 | 1180 MPa class high strength steel sheet | 1.8 | 100 | 80 | 0.8 | 10 | B |
| Comp. Ex. 25 | 1180 MPa class high strength steel sheet | 1.8 | 100 | 80 | 0.8 | Fractures | C |
| Inv. Ex. 26 | 1180 MPa class high strength steel sheet | 1.8 | 50 | 80 | 1.6 | 9 | B |
| Comp. Ex. 26 | 1180 MPa class high strength steel sheet | 1.8 | 50 | 80 | 1.6 | Fractures | C |
| Inv. Ex. 27 | 1180 MPa class high strength steel sheet | 1.8 | 30 | 80 | 2.7 | 7 | A |
| Comp. Ex. 27 | 1180 MPa class high strength steel sheet | 1.8 | 30 | 80 | 2.7 | Fractures | C |
| Inv. Ex. 28 | 980 MPa class high strength steel sheet | 1.8 | 100 | 80 | 0.8 | 15 | B |
| Comp. Ex. 28 | 980 MPa class high strength steel sheet | 1.8 | 100 | 80 | 0.8 | Fractures | C |
| Inv. Ex. 29 | 980 MPa class high strength steel sheet | 1.8 | 50 | 80 | 1.6 | 10 | A |
| Comp. Ex. 29 | 980 MPa class high strength steel sheet | 1.8 | 50 | 80 | 1.6 | Fractures | C |
| Inv. Ex. 30 | 980 MPa class high strength steel sheet | 1.8 | 30 | 80 | 2.7 | 10 | A |
| Comp. Ex. 30 | 980 MPa class high strength steel sheet | 1.8 | 30 | 80 | 2.7 | Fractures | C |
| Inv. Ex. 31 | 780 MPa class high strength steel sheet | 1.8 | 100 | 80 | 0.8 | 15 | A |
| Comp. Ex. 31 | 780 MPa class high strength steel sheet | 1.8 | 100 | 80 | 0.8 | Fractures | C |
| Inv. Ex. 32 | 780 MPa class high strength steel sheet | 1.8 | 50 | 80 | 1.6 | 13 | A |
| Comp. Ex. 32 | 780 MPa class high strength steel sheet | 1.8 | 50 | 80 | 1.6 | 18 | B |
| Inv. Ex. 33 | 780 MPa class high strength steel sheet | 1.8 | 30 | 80 | 2.7 | 11 | A |
| Comp. Ex. 33 | 780 MPa class high strength steel sheet | 1.8 | 30 | 80 | 2.7 | 17 | B |
| Inv. Ex. 34 | 590 MPa class high strength steel sheet | 1.8 | 100 | 80 | 0.8 | 15 | A |
| Comp. Ex. 34 | 590 MPa class high strength steel sheet | 1.8 | 100 | 80 | 0.8 | 20 | B |
| Inv. Ex. 35 | 590 MPa class high strength steel sheet | 1.8 | 50 | 80 | 1.6 | 13 | A |
| Comp. Ex. 35 | 590 MPa class high strength steel sheet | 1.8 | 50 | 80 | 1.6 | 20 | B |
| Inv. Ex. 36 | 590 MPa class high strength steel sheet | 1.8 | 30 | 80 | 2.7 | 13 | A |
| Comp. Ex. 36 | 590 MPa class high strength steel sheet | 1.8 | 30 | 80 | 2.7 | 15 | A |

REFERENCE SIGNS LIST

11 flat sheet part
12 second vertical wall part
13 recessed part
14 outside edge part
15 first vertical wall part
16 first flange part
21 blank
22 punch
23 die
24 blank holder
25 space
31 blank
32 punch
33 pad
34 die
71 die
72 blank
73 blank holder
74 punch
81 top sheet part
82a, 82b recessed part
83a, 83b first vertical wall part
84a, 84b first flange part
85 second vertical wall part

The invention claimed is:

1. A method of production of the structural member of an integral shaped article using a steel sheet having a tensile strength of 590 MPa or more, the structural member comprising:

a top sheet part including at least one recessed part at an outside edge part in a plan view;

a first vertical wall part extending bent from a part or all of the outside edge part including the recessed part in the top sheet part;

a first flange part extending bent from an edge of the first vertical wall part at an opposite side to the top sheet part; and a second vertical wall part extending bent from an edge of the top sheet part different from the outside edge part including the recessed part, the method of production comprising the steps of:
placing a flat sheet blank between a die and a blank holder, and forming the second vertical wall part by moving the blank relative to a punch to press and deform the blank; and
placing the blank in which the second vertical wall part is formed between a die and a blank holder, and forming a first vertical wall part and a first flange part by moving the blank relative to a punch to press and deform the blank,
wherein the die or the blank holder used in the step of forming the second vertical wall part is provided with a space in at least one part of a position contacting the blank at the time of the pressing.

2. The method of production of the structural member according to claim 1 wherein the space is provided to include a position at which the most amount of material flow when forming the second vertical wall part.

3. The method of production of the structural member according to claim 1 further comprising the steps of placing, between the die and the blank holder, the blank in which the first vertical wall part, the first flange part and the second vertical wall part are formed, and adjusting a shape of the second vertical wall part by moving the blank relative to a punch to press and deform the blank.

4. The method of production of the structural member according to claim 2 further comprising the steps of placing, between the die and the blank holder, the blank in which the first vertical wall part, the first flange part and the second vertical wall part are formed, and adjusting a shape of the second vertical wall part by moving the blank relative to a punch to press and deform the blank.

5. A method of production of the structural member of an integral shaped article using a steel sheet having a tensile strength of 590 MPa or more,
the structural member comprising:
a top sheet part including at least one recessed part at an outside edge part in a plan view;
a first vertical wall part extending bent from a part or all of the outside edge part including the recessed part in the top sheet part;
a first flange part extending bent from an edge of the first vertical wall part at an opposite side to the top sheet part; and
a second vertical wall part extending bent from an edge of the top sheet part different from the outside edge part including the recessed part,
a second flange part extending bent from an edge of the second vertical wall part at an opposite side to the top sheet part,
the method of production comprising the steps of:
placing a flat sheet blank between a die and a blank holder, and forming the second vertical wall part and the second flange part by moving the blank relative to a punch to press and deform the blank; and
placing the blank in which the second vertical wall part is formed between a die and a blank holder, and forming the first vertical wall part and the first flange part by moving the blank relative to a punch to press and deform the blank,
wherein the die or the blank holder used in the step of forming the second vertical wall part and second flange part is provided with a space in at least one part of a position contacting the blank at the time of the pressing.

6. The method of production of the structural member according to claim 5 wherein the space is provided to include a position at which the most amount of material flow when forming the second vertical wall part and the second flange part.

7. The method of production of the structural member according to claim 5 further comprising the steps of placing the blank in which the first vertical wall part, the first flange part, the second vertical wall part and the second flange part are formed between a die and a blank holder, and adjusting a shape of the second vertical wall part and the second flange part by moving relative to a punch to press and deform the blank.

8. The method of production of the structural member according to claim 6 further comprising the steps of placing the blank in which the first vertical wall part, the first flange part, the second vertical wall part and the second flange part are formed between a die and a blank holder, and adjusting a shape of the second vertical wall part and the second flange part by moving relative to a punch to press and deform the blank.

* * * * *